Patented Nov. 17, 1942

2,302,324

UNITED STATES PATENT OFFICE 2,302,324

NITRIC ACID ESTERS OF MONOACYL GLYCERINES AND THEIR PRODUCTION

Helmut Jacobi and Walter Flemming, Ludwigshafen-on-the-Rhine, Germany; vested in the Alien Property Custodian No Drawing. Application January 24, 1939, Serial No. 252,591. In Germany February 10, 1938

6 Claims. (Cl. 260—467)

The present invention relates to the production of nitric acid esters of monoacyl glycerines.

We have found that nitric acid esters of monoacyl glycerines are obtained in a simple manner by reacting glycide nitrate with organic acids. By nitrating the resulting mononitric acid esters dinitric acid esters are obtained. Suitable acids are for example carboxylic acids, as for example aliphatic carboxylic acids, such as formic acid, acetic acid and also aromatic acids, such as benzoic acid and their substitution products.

The reaction is preferably carried out by mixing the glycide nitrate with about an equivalent amount of acid and keeping the liquid mixture at elevated temperature, e. g. temperatures between 60° and 120° C. for some time until the adding on is completed. The duration of the reaction may be appreciably shortened in most cases by working in the presence of a small amount of a metal chloride, advantageously of ferric chloride. The reaction may also if desired be carried out in a solvent without injurious action on the reaction. However, water should not be used as a solvent. The mononitric acid esters of monoacyl glycerines thus formed may be readily recovered by distillation of the reaction mixture. The dinitric acid esters are obtained in a simple manner by nitrating in the usual manner the mononitric acid esters with concentrated nitric acid, preferably in the presence of concentrated sulphuric acid.

The mono- and di-nitric acid esters of monoacyl glycerines obtainable readily according to this invention are eminently suitable for mixing with glycerine trinitrate or other liquid explosives which tend to solidify at low temperatures to render them more difficult to freeze.

The following examples will further illustrate how our present invention may be carried out in practice, but the invention is not restricted to these examples. The parts are by weight.

Example 1

1 part of ferric chloride is added to a mixture of 238 parts of glycide nitrate and 105 parts of 100 per cent formic acid. The mixture heats spontaneously and the temperature is kept at from 95° to 100° C. for about one quarter of an hour. By distilling under reduced pressure, glycerine monoformate mononitrate having a boiling point of from 125° to 126° C. under a pressure of 2 millimetres (mercury gauge) is obtained from the reaction mixture in a very good yield.

Example 2

A mixture of 238 parts of glycide nitrate with 150 parts of glacial acetic acid, to which 1.5 parts of ferric chloride have been added, is heated for 15 minutes at from 95° to 100° C. The reaction mixture is washed with a little water to remove the ferric chloride, shaken with dilute soda solution and dried with anhydrous sodium sulphate. Almost completely pure glycerine monoacetate mononitrate having a boiling point of from 124° to 125° C. under a pressure of 2 millimetres (mercury gauge) is thus obtained.

Example 3

A mixture of 238 parts of glycide nitrate, 334 parts of meta-nitrobenzoic acid and 1 part of ferric chloride is heated at from 100° to 110° C. The mixture, which originally is unhomogeneous, soon becomes homogeneous and dark red in color. After the course of 2 hours, it is cooled, washed with water and dilute soda solution and dried. A good yield of glycerine mononitrobenzoate mononitrate is thus obtained.

Example 4

The method of nitrating the mononitric acid esters obtainable according to Examples 1 to 3 is hereinafter described by way of example starting from glycerine monoacetate mononitrate.

40 parts of glycerine monoacetate mononitrate are slowly introduced into a mixture of 75 parts of nitric acid having a specific gravity of 1.5 and 10 parts of oleum having an $SO_3$-content of 25 per cent, care being taken that the temperature does not rise above 25° C. After separating the acid, the reaction mixture is washed with water and dilute soda solution. Glycerine monoacetate dinitrate is thus obtained in a very good yield.

What we claim is:

1. A process for the manufacture of nitric acid esters of monoacyl glycerines which comprises reacting in the liquid phase at an elevated temperature up to about 120° C. a mixture of glycide nitrate and an acid selected from the class consisting of aliphatic carboxylic acids and aromatic carboxylic acids of the benzene series.

2. A process for the manufacture of nitric acid esters of monoacyl glycerines which comprises reacting in the liquid phase at an elevated temperature up to about 120° C. a mixture of glycide nitrate and an acid selected from the class consisting of aliphatic carboxylic acids and aromatic carboxylic acids of the benzene series in the presence of a catalytic amount of ferric chloride.

3. A process for the manufacture of nitric acid esters of monoacyl glycerines which comprises reacting in the liquid phase at an elevated temperature up to about 120° C. a mixture of glycide nitrate and an aliphatic carboxylic acid containing up to two carbon atoms in the presence of a catalytic amount of ferric chloride.

4. Derivatives of glycerine in which one hydroxyl group of the glycerine in the 1-position is substituted by the radicle —O—NO$_2$, one of the remaining hydroxyl groups is substituted by the radicle of an acid selected from the class consisting of aliphatic carboxylic acids and aromatic carboxylic acids of the benzene series and in which the third hydroxyl group of the glycerine is present as such.

5. A derivative of glycerine in which one hydroxyl group of the glycerine in the 1-position is substituted by the radicle —O—NO$_2$, one of the remaining hydroxyl groups is substituted by the radicle of formic acid and the third hydroxyl group is present as such.

6. A derivative of glycerine in which one hydroxyl group of the glycerine in the 1-position is substituted by the radicle —O—NO$_2$, one of the remaining hydroxyl groups is substituted by the radicle of acetic acid and the third hydroxyl group is present as such.

HELMUT JACOBI.
WALTER FLEMMING.